US012667219B2

(12) United States Patent
DelTorto et al.

(10) Patent No.: US 12,667,219 B2
(45) Date of Patent: Jun. 30, 2026

(54) COOKING VESSEL

(71) Applicant: WHIRLPOOL CORPORATION, Benton Harbor, MI (US)

(72) Inventors: Fancesco DelTorto, Pero (IT); Alessandro Gigante, Comerio (IT); Daniele Masi, Travedona Monate (IT); Simone Polvara, Bareggio (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1155 days.

(21) Appl. No.: 17/685,838

(22) Filed: Mar. 3, 2022

(65) Prior Publication Data

US 2023/0276981 A1 Sep. 7, 2023

(51) Int. Cl.
*A47J 36/02* (2006.01)
*H05B 6/12* (2006.01)

(52) U.S. Cl.
CPC .......... *A47J 36/027* (2013.01); *H05B 6/1209* (2013.01)

(58) Field of Classification Search
CPC .. H05B 6/6494; H05B 6/1209; H05B 6/6408; A47J 36/027
See application file for complete search history.

(56) References Cited

U.S. PATENT DOCUMENTS 5,155,319 A 10/1992 Chiu
6,077,454 A 6/2000 Tenzer

| | | | |
|---|---|---|---|
| 7,906,748 B2 | 3/2011 | Imura | |
| 10,251,223 B2 | 4/2019 | Linton | |
| 10,791,871 B2 | 10/2020 | Park | |
| 2011/0297672 A1* | 12/2011 | Niklasson | H05B 6/6447 |
| | | | 219/702 |
| 2015/0208846 A1* | 7/2015 | Ferron | B21D 51/22 |
| | | | 29/522.1 |
| 2015/0313398 A1 | 11/2015 | Park | |

FOREIGN PATENT DOCUMENTS

| | | | |
|---|---|---|---|
| CN | 201370439 Y | * | 12/2009 |
| CN | 102048449 A | * | 5/2011 |
| EP | 3025625 A1 | | 6/2016 |
| KR | 20180012991 A | | 2/2018 |
| WO | 2016007202 A1 | | 1/2016 |

* cited by examiner

*Primary Examiner* — Thien S Tran

(74) *Attorney, Agent, or Firm* — Price Heneveld LLP

(57) ABSTRACT

A cooking vessel includes a cooking surface and a lower portion positioned below the cooking surface. A first material is disposed within the lower portion and is in thermal proximity to the cooking surface. The first material increases in temperature upon absorption of electromagnetic radiation. A second material is disposed within the lower portion and in thermal proximity to the cooking surface. An electrical current is induced in the second material upon exposure to an electromagnetic field. Both the first material and the second material are configured to heat the cooking surface of the cooking vessel when used in a microwave oven or on an induction cooktop, respectively.

16 Claims, 6 Drawing Sheets

COOKING VESSEL

BACKGROUND

The present device generally relates to a cooking vessel, and more specifically, to a plate for use with either a microwave oven or an induction cooktop. Currently, dedicated cookware items are provided for use with either a microwave oven or an induction cooktop. The present concept seeks to provide a plate that can be used with both cooking techniques.

SUMMARY

Known cooking vessels called "crisp plates" are characterized by surfaces that can be heated up by means of magnetic dielectric loss mechanism. In at least one aspect of the present disclosure, a crisp plate cooking vessel includes a cooking surface with a lower portion that is positioned below the cooking surface. A magnetic field-absorbing material (hereafter microwave-absorbing material) is disposed within the lower portion. A ferromagnetic material (hereafter induction material) is disposed within the lower portion. The induction material is disposed in discrete portions of the lower portion. Thanks to these features, the cooking vessel of the present disclosure can be used for cooking food items in a microwave oven having a crisp cooking function based on dielectric loss mechanism, as well as for cooking food items on an induction cooktop, based on induced Eddy currents.

In at least another aspect, a crisp plate is configured for use with a microwave oven or with an induction cooktop. The crisp plate includes a plate having a cooking surface. An induction material is formed of an electrically conductive material, such that an electrical current is induced in the induction material by an electromagnetic field when the plate is placed on an induction cooktop. The induction material is thermally coupled to the cooking surface of the plate. The induction material heats the cooking surface when the electrical current is induced in the induction material. A microwave-absorbing material includes a rubber-embedded ferrite material configured to increase in temperature upon absorption of electromagnetic radiation. The microwave-absorbing material is thermally coupled to the cooking surface of the plate. The microwave-absorbing material heats the cooking surface when exposed to electromagnetic radiation.

In at least another aspect, a crisp plate includes a cooking surface and a lower portion positioned below the cooking surface. A first material is disposed within the lower portion and is in thermal proximity to the cooking surface. The first material increases in temperature upon absorption of electromagnetic radiation. A second material is disposed within the lower portion and is in thermal proximity to the cooking surface. An electrical current is induced in the second material upon exposure to an electromagnetic field.

These and other features, advantages, and objects of the present device will be further understood and appreciated by those skilled in the art upon studying the following specification, claims, and appended drawings.

DETAILED DESCRIPTION OF EMBODIMENTS

Figure 1:
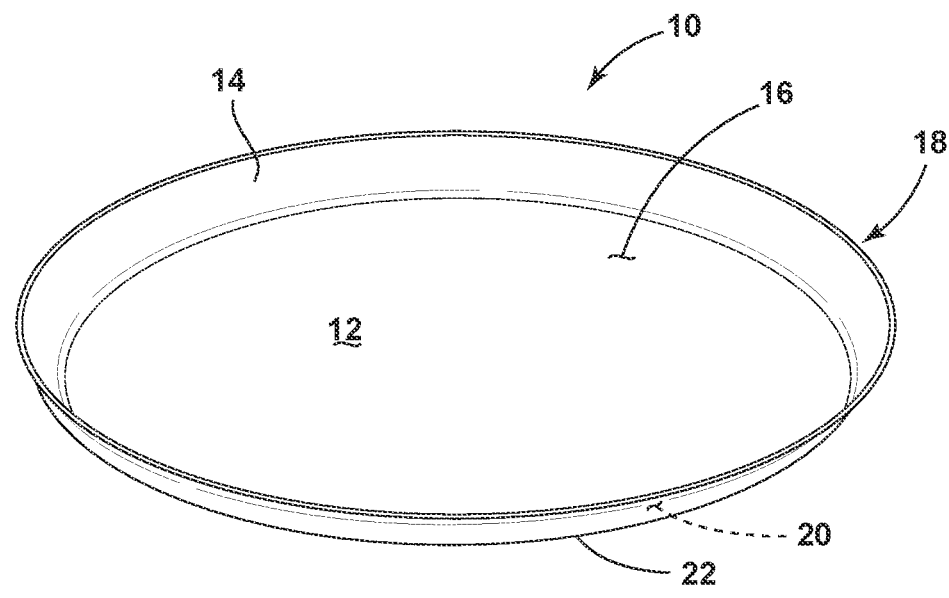
FIG. 1 is a top perspective view of a crisp plate.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A crisp plate or browning plate usually comprises a microwave absorbing layer arranged in thermal contact with another layer having relatively good thermal conductivity. In particular, the antennas are preferably arranged, such that the magnetic field vector of microwaves fed into a cooking cavity of microwave oven is directed substantially along the microwave-absorbing layer in order to generate magnetic losses in the layer and thereby heat the crisp plate or browning plate. Typically, the microwave-absorbing layer corresponds to the underside (or the sole) of the crisp plate or browning plate, and the piece of food can be browned on the thermally conductive layer, i.e. at the upper side of the crisp or browning plate. Generally, the upper side of the crisp plate or browning plate may consist of an aluminum (or steel) plate which has small thermal mass and good thermal conductivity and possibly a non-stick coating. In the present specification, a crisp plate 10 is provided, wherein microwave-absorbing materials and induction materials are positioned horizontally adjacent to one another in a patterned configuration, as opposed to a stacked or layered configuration known in the art. In this way, microwave-absorbing materials are positioned side-by-side with induction materials, as opposed to one on top of another in a traditional layered configuration, as further described below. Thus, in the present concept, the microwave-absorbing material and the induction material are in contact with a cooking surface of the crisp plate 10, instead of just one material being in contact with the cooking surface in a layered configuration.

Referring now to FIG. 1, a crisp plate 10 is shown having a cooking surface 12. The cooking surface 12 is a substantially planar surface configured to support a food item for cooking. In the embodiment shown in FIG. 1, a rim 14 upwardly extends from the cooking surface 12 to define an interior volume 16 of the crisp plate 10. The crisp plate 10 further includes a lower portion 20 disposed below the cooking surface 12. An underside 22 of the lower portion 20 of the crisp plate 10 is positioned opposite the cooking surface 12, and is used to support the crisp plate 10 in a substantially upright manner. The crisp plate 10 is contemplated to be comprised of a metal material, such as a non-ferrous metal material like aluminum for example, which is highly thermally conductive. More particularly, the crisp plate 10 may include a casing 18 made of the highly thermally conductive metal material noted above, e.g. aluminum, wherein the casing 18 surrounds side portions of the lower portion 20 and further includes the cooking surface 12 and the rim 14.

Figure 2:
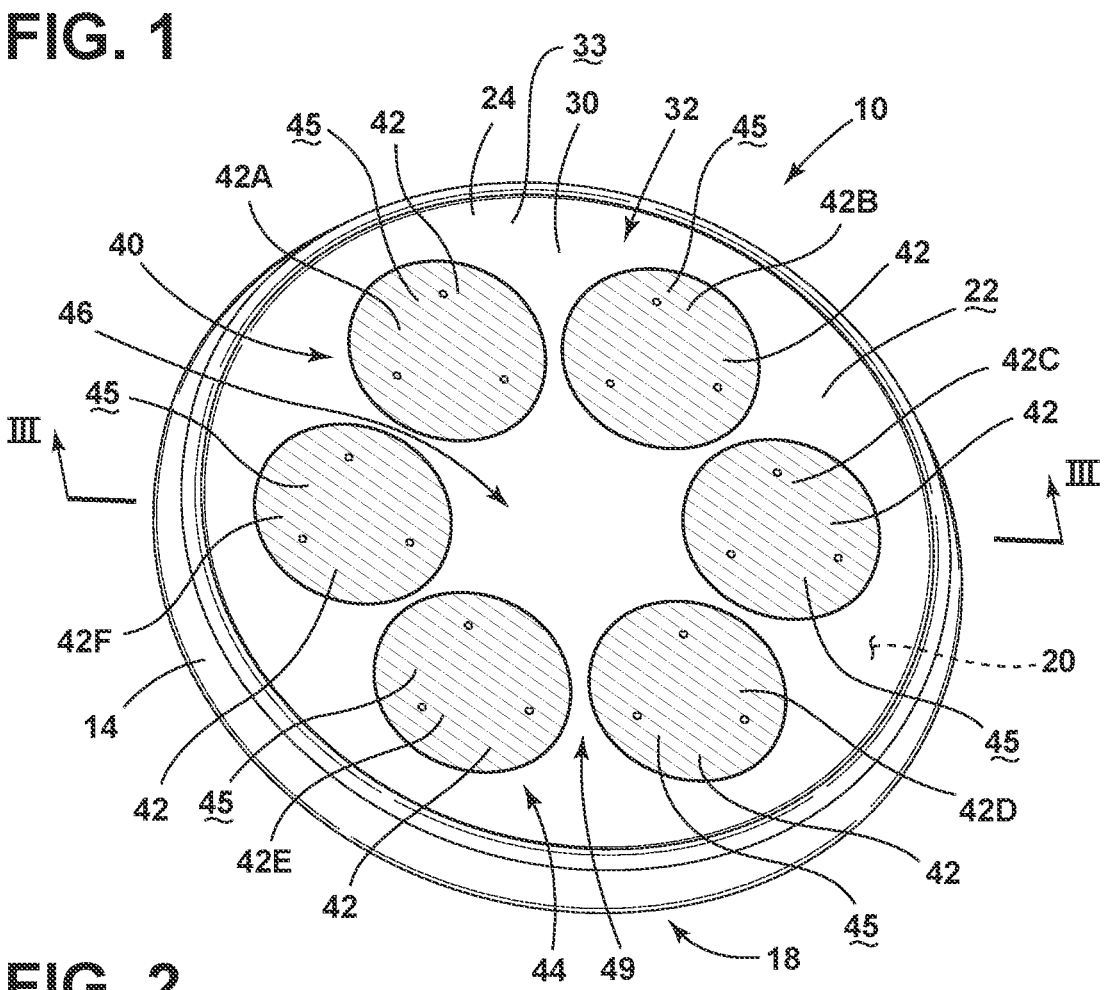
FIG. 2 is a bottom perspective view of the crisp plate of FIG. 1.

Referring now to FIG. 2, the underside 22 of the lower portion 20 of the crisp plate 10 of the present concept is shown with a microwave-absorbing material 30 disposed in the lower portion 20 of the crisp plate 10. The microwave-absorbing material 30 is contemplated to be positioned at least in discrete zones of the lower portion 20, such that the microwave-absorbing material 30 is thermally coupled to the cooking surface 12 of the crisp plate 10. In this way, the microwave-absorbing material 30 heats the cooking surface 12 when the microwave-absorbing material 30 is exposed to electromagnetic radiation and absorbs the same. The microwave-absorbing material 30 may include a ferrite component and a rubber component to provide a rubber-embedded ferrite material. The rubber material may include an epoxy resin or a silicon dioxide component. In an embodiment wherein the microwave-absorbing material 30 includes a rubber-embedded ferrite material, such a material composition may include a proportion of about 75% of a ferrite component and about 25% of a silicon dioxide component. The rubber component is non-reactive to microwave energy. The ferrite component is highly reactive to microwave energy and absorbs microwave energy when exposed thereto. The term "ferrites" refers to magnetic oxides containing iron as a major component thereof. The ferrite component has a Curie point at which absorption of microwaves in the material ceases. The characteristics for absorption of the microwaves in the ferrite component may be varied by altering the thickness of the microwave-absorbing material 30 and/or the composition of the microwave-absorbing material 30. Having the microwave-absorbing material 30, the crisp plate 10 of the present concept is suitable for use in a microwave oven where microwaves are generated and absorbed by the microwave-absorbing material 30 to then rapidly heat the cooking surface 12 of the crisp plate 10 to provide a browning feature for food cooked on the crisp plate 10. Thus, the microwave-absorbing material 30 is configured to increase in temperature upon absorption of electromagnetic radiation provided by a microwave oven. Use of the crisp plate 10 in a microwave oven, is further described below with reference to FIGS. 6-7.

With further reference to FIG. 2, the crisp plate 10 of the present concept further includes an induction material 42 disposed in discrete zones of the lower portion 20 of the crisp plate 10. The induction material 42 is contemplated to be made from an electrically conductive material. The electrically conductive material comprising the induction material 42 is preferably a ferromagnetic material, such as 400 series stainless steel, iron or the like. The induction material 42 is configured to be inductively heated via an electromagnetic field generated by an inductive coil of an induction cooktop when the induction material 42 is exposed to the electromagnetic field. Thus, an electrical current is induced in the induction material 42 by an electromagnetic field when the crisp plate 10 is placed on an active induction cooktop. Like the microwave-absorbing material 30 noted above, the induction material 42 is positioned within the lower portion 20 of the crisp plate 10, such that the induction material is thermally coupled to the cooking surface 12 of the crisp plate 10. As such, the induction material 42 heats the cooking surface 12 when the electrical current is induced in the induction material 42. Thus, the crisp plate 10 of the present concept includes two different heating materials (the microwave-absorbing material 30, and the induction material 42) that are discretely positioned within the lower portion 20 of the crisp plate 10 and thermally coupled to the cooking surface 12 of the crisp plate 10, thereby forming respective heating arrangements or patterns. This thermal coupling arrangement may include the microwave-absorbing material 30 and the induction material 42 being in direct contact with the cooking surface 12, or may include a configuration wherein the microwave-absorbing material 30 and the induction material 42 are positioned adjacent to the cooking surface 12.

The induction material 42 is contemplated to be at least partially electrically resistive, such that an induced electrical current within the induction material 42 creates heat within the induction material 42 when the induction material 42 is exposed to an electromagnetic field. This heat from the induced electrical current in the induction material 42 is transferred into the interior volume 16 of the crisp plate 10, such that cooking operations can be accomplished within the interior volume 16 of the crisp plate 10, specifically at the cooking surface 12, to which the induction material 42 is thermally coupled.

In the various embodiments, it is contemplated that the induction material 42 can be made of various materials that are both ferromagnetic and electrically conductive, such that the induction material 42 is electromagnetically contoured. Such materials contemplated for use as the induction material 42 of the present concept may include, but are not limited to, iron, nickel, cobalt, alloys thereof, metal oxide hybrids, and other various materials that are both ferromagnetic and electrically conductive. The ferromagnetic properties of the induction material 42 provide the crisp plate 10 with the properties necessary to operate in conjunction with an induction cooking appliance. Use of the crisp plate 10 with an induction cooking appliance is further described below with reference to FIGS. 8-9.

It is further contemplated that, in various embodiments, the induction material 42 can be made up of more than one material, wherein one material is ferromagnetic and another material is electrically conductive. In such an embodiment, the two materials would be combined, such that the necessary ferromagnetic and electrically conductive properties can be included within the induction material 42 when exposed to a magnetic field of an induction cooking appliance. The combination of such materials can be accomplished by creating an alloy of various metals, or by forming a structure where the ferromagnetic material and the electrically conductive material are mechanically combined by one of various operations that may include, but are not limited to, layering, weaving, using alternating bands of dissimilar metals, and other various combining operations that are sufficient to distribute the ferromagnetic and electrically conductive properties evenly across the specific locations of the underside 22 of the crisp plate 10 where the induction material 42 is positioned.

As further shown in FIG. 2, the microwave-absorbing material 30 defines a background 32 having an outer surface 33. A plurality of discrete deposits 40 of induction material 42 is disposed within the microwave-absorbing material 30.

The plurality of discrete deposits 40 of induction material 42 are shown in FIG. 2 as columns 42A-42F of induction material 42 disposed along the underside 22 of the crisp plate 10. As specifically shown in FIG. 2, the columns 42A-42F of induction material 42 are positioned in a ring pattern 44 to evenly distribute the induction material 42 along the underside 22 of the crisp plate 10. In the embodiment shown in FIG. 2, the microwave-absorbing material 30 is configured around a perimeter 24 of the underside 22 of the crisp plate 10. The microwave-absorbing material 30 is also positioned within a center 46 of the ring pattern 44 and between each column 42A-42F of the induction material 42, such that the microwave-absorbing material 30 is also evenly distributed along the underside 22 of the crisp plate 10. It is contemplated that the columns 42A-42F of the induction material 42 and the microwave-absorbing material 30 surrounding the columns 42A-42F of the induction material 42 may be exposed features on the underside 22 of the crisp plate 10, as shown in FIG. 2. As further shown in FIG. 2, each column 42A-42F of the induction material 42 includes an outer surface 45. The outer surfaces 45 of each column 42A-42F of the induction material 42 may extend beyond the outer surface 33 defined by the microwave-absorbing material 30. In this way, the columns 42A-42F of the induction material 42 act as a stand-off feature to define air gaps 49 therebetween. The air gaps 49 facilitate the ability of microwaves to reach the microwave-absorbing material 30 during a microwave cooking technique, as further described below.

As noted above, the lower portion 20 of the crisp plate 10 is positioned below the cooking surface 12. The lower portion 20 may be provided in the form of a downwardly opening cavity. The microwave-absorbing material 30 and the induction material 42 are contemplated to be disposed in a side-by-side or horizontally adjacent configuration within the lower portion 20 of the crisp plate 10. Thus, the microwave-absorbing material 30 and the induction material 42 are not layered on top of one another, but rather positioned horizontally adjacent to one another below the cooking surface 12. In this way, both the microwave-absorbing material 30 and the induction material 42 are positioned within thermal proximity to the cooking surface 12. The position of the microwave-absorbing material 30 and the induction material 42 relative to the cooking surface 12 can be described as the microwave-absorbing material 30 and the induction material 42 being in thermal proximity to the cooking surface 12, in thermal communication with the cooking surface 12, directly coupled with the cooking surface 12, or thermally coupled to the cooking surface 12. The configuration of the microwave-absorbing material 30 and the induction material 42 to the cooking surface 12 provides for a heating of the cooking surface 12 via the microwave-absorbing material 30 or the induction material 42 when the crisp plate 10 is exposed to electromagnetic radiation in a microwave, or exposed to an electromagnetic field, respectively. As such, the microwave-absorbing material 30 defines a first material disposed within the lower portion 20 of the crisp plate 10 that is in thermal proximity to the cooking surface 12. This first material (i.e. the microwave-absorbing material 30) increases in temperature upon absorption of electromagnetic radiation, as exposed thereto in a microwave oven. Similarly, the induction material 42 defines a second material disposed within the lower portion 20 of the crisp plate 10 that is in thermal proximity to the cooking surface 12. An electrical current is induced in this second material (i.e. the induction material 42) upon exposure to an electromagnetic field generated by an induction cooktop.

As shown in the various embodiments of the crisp plate 10 provided herein, the induction material 42 is disposed in discrete portions of the lower portion 20. That is to say, the induction material 42 is not intermixed or vertically layered within the lower portion 20 of the crisp plate 10, but rather, positioned in discrete portions of the lower portion 20 of the crisp plate 10. While FIG. 2 shows the microwave-absorbing material 30 as the background 32 to the induction material 42, is contemplated that the portions of the lower portion 20 filled with the microwave-absorbing material 30 in FIG. 2 could be filled with the induction material 42, wherein the microwave-absorbing material 30 would be positioned in discrete deposits within the lower portion 20. The overall patterned configuration illustrated in FIG. 2 is engineered to provide sufficient coverage of both the microwave-absorbing material 30 and the induction material 42 to the cooking surface 12 of the crisp plate 10, such that the crisp plate 10 can be rapidly heated in a microwave oven, or on an induction cooktop.

Figure 3:
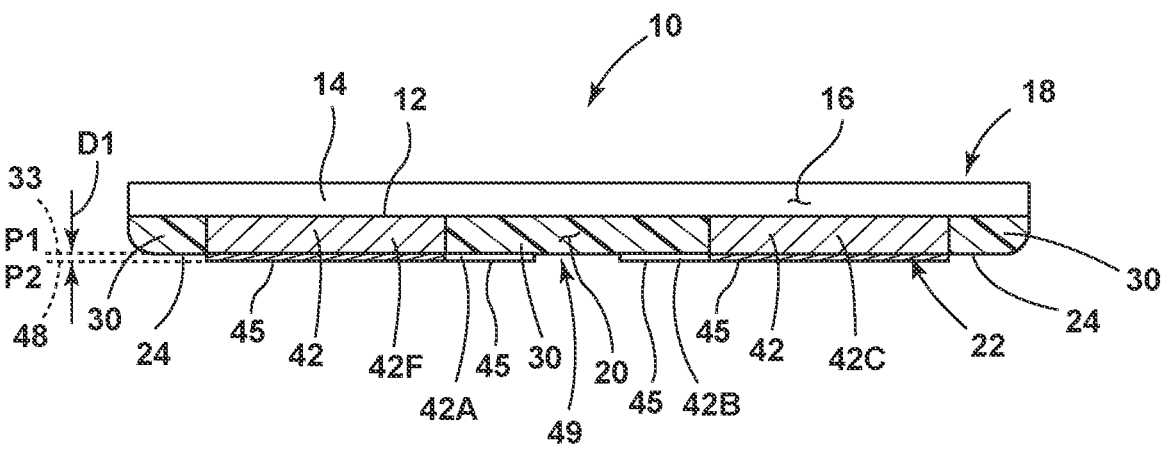
FIG. 3 is a cross-sectional view of the crisp plate of FIG. 2 taken at line III.

Referring now to FIG. 3, the cross-sectional view of the crisp plate 10 of FIG. 3 shows discrete portions of the lower portion 20 having the microwave-absorbing material 30 and the induction material 42 positioned in a side-by-side configuration or a horizontally adjacent configuration, wherein both the microwave-absorbing material 30 and the induction material 42 are disposed directly below the cooking surface 12 within the lower portion 20, such that the microwave-absorbing material 30 and the induction material 42 are both in thermal communication with the cooking surface 12 of the crisp plate 10 in an evenly dispersed pattern 44. Typically, a crisp plate is positioned within a microwave oven on a glass turntable or even directly supported on a bottom wall of a microwave oven cavity. An important feature to allow microwaves to reach the microwave-absorbing material is to keep an air gap between a support surface and the underside of the crisp plate. This is usually achieved by supporting features, such as feet or spacers, which are provided directly on the microwave-absorbing material. According to the present concept, this feature is provided by managing the thickness of the ferromagnetic induction material 42 in such a way that the induction material 42 is in contact with an induction cooktop, when used thereon, and to provide the spacing necessary to allow microwaves to reach the microwave-absorbing material 30 when used in a microwave oven. As shown in FIG. 3, the outer surfaces 45 of the columns 42A-42F of the induction material 42 define a support surface 48 that extends beyond the outer surface 33 defined by the microwave-absorbing material 30. In this way, the support surface 48 provides the air gaps 49 needed to provide microwaves access to the microwave-absorbing material 30 in a microwave oven, and to ensure direct contact of the induction material 42, at the support surface 48, to an induction cooktop to facilitate maximum matching and efficiency when used with an induction cooktop.

As further shown in the embodiment of FIG. 3, the outer surface 33 of the microwave-absorbing material 30 is disposed in a first plane P1, while the support surface 48 made up of the columns 42A-42F of the induction material 42 that extend beyond the outer surface 33 of the microwave-absorbing material 30 are positioned in a second plane P2. The first plane and the second plane P2 are spaced apart by a distance D1, which defines a length of the air gaps 49 provided by the configuration shown in FIG. 3. Thus, as shown in FIG. 3, the microwave-absorbing material 30 is configured within the lower portion 20 to define the outer surface 33 thereof that is positioned within the first plane P1. The discrete portions of the induction material 42 each include an outer surface 45 positioned within the second plane P2 that is outwardly spaced-apart from the first plane P1 by a distance D1. Said differently, the microwave-absorbing material 30 defines a first material configured within the lower portion 20 of the crisp plate 10 to define an outer surface 33 of the first material. Each column of the columns 42A-42F of the plurality of columns 40 includes an outer surface 45 defining a support surface 48 of the crisp plate 10 that is comprised of a second material (i.e. the induction material 42). This is due to the configuration shown in FIGS. 2 and 3, wherein the distal ends (identified at or near the outer surfaces 45) of the of the columns 42A-42F extend outwardly beyond the outer surface 33 of the first material (i.e. the microwave-absorbing material 30).

Figure 4:
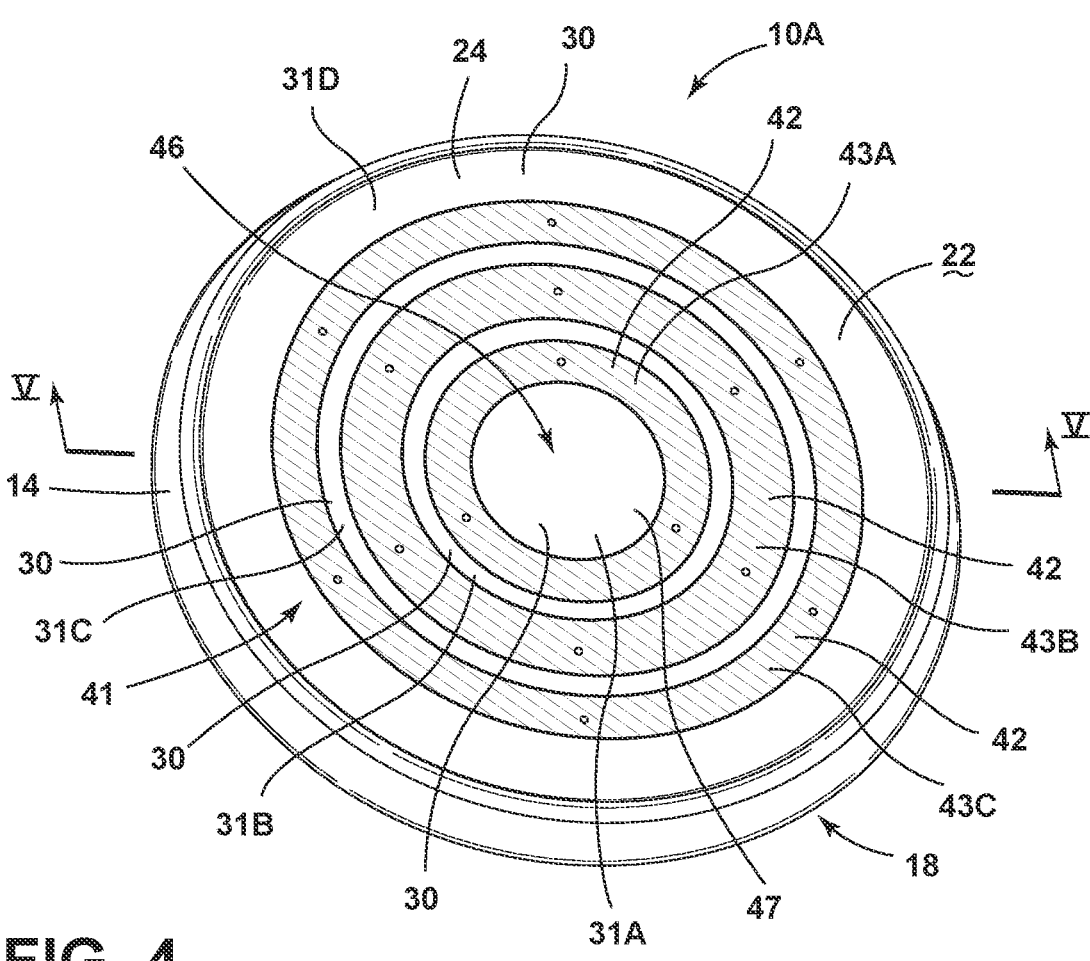
FIG. 4 is a bottom perspective view of another embodiment of the crisp plate of FIG. 1.

Referring now to FIG. 4, the microwave-absorbing material 30 and the induction material 42 are shown disposed in an alternating ring pattern 41 along the lower portion 20 of a crisp plate 10A. As specifically shown in FIG. 4, the crisp plate 10A includes a centrally-disposed circle 31A of microwave-absorbing material 30 positioned within the lower portion 20 of the crisp plate 10A. Positioned around an outer perimeter 47 of the centrally-disposed circle 31A is a ring 43A comprised of the induction material 42. As further shown in FIG. 4, the alternating ring pattern 41 of the crisp plate 10A includes a plurality of rings 43A, 43B and 43C comprised of induction material 42 configured in an alternating ring configuration with a plurality of rings 31B, 31C and 31D comprised of microwave-absorbing material 30. It is contemplated that any number of alternating rings may be provided in the alternating ring pattern 41 of the crisp plate 10A as necessary to provide an even distribution of the microwave-absorbing material 30 and the induction material 42 relative to the cooking surface 12 of the crisp plate 10A. It is further contemplated that the rings of the alternating ring pattern 41 of the crisp plate 10A may be configured in an opposite configuration wherein the center 46 of the lower portion 20 may be provided with the induction material 42 that is surrounded by the microwave-absorbing material 30, from which the alternating ring pattern 41 radiates outwardly therefrom alternating materials towards the perimeter 24 of the lower portion 20. The alternating ring pattern is advantageous in that it allows to achieve a more uniform heating pattern of the cooking surface whatever the heating source is. Much like the columns 42A-42F of the induction material 42 discussed above with reference to crisp plate 10, outer surfaces of the rings 43A, 43B and 43C of the induction material 42 of crisp plate 10A may extend beyond outer surfaces of the rings 31B, 31C and 31D of the microwave-absorbing material 30 to define a support surface and air gap configuration.

As shown in FIG. 4, the lower portion 20 of the crisp plate 10A includes a first zone (ring 43A of the induction material 42) surrounding a second zone (centrally-disposed circle 31A of the microwave-absorbing material 30). Similarly, it can be said that the lower portion 20 of the crisp plate 10 of FIG. 2 includes a first zone (the background 32 of the microwave-absorbing material 30) surrounding a second zone (any one of the columns 42A-42F of the induction material 42). Thus, in FIG. 2, the induction material 42 is positioned in a plurality of columns 40 within the lower portion 20, wherein the microwave-absorbing material 30 surrounds each column 42A-42F of the plurality of columns 40 of induction material 42 within the lower portion 20.

Figure 5:
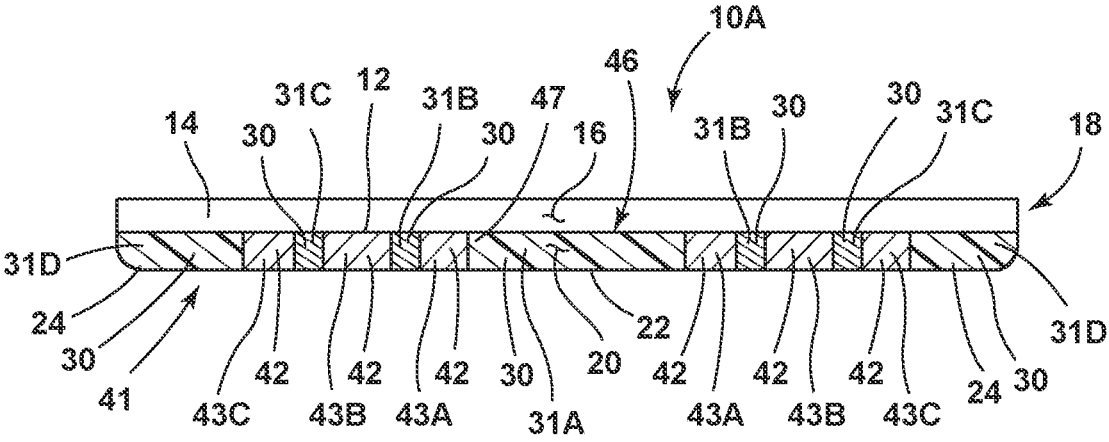
FIG. 5 is a cross-sectional view of the crisp plate of FIG. 4 taken at line V.

Referring now to FIG. 5, the cross-sectional view of the crisp plate 10A of FIG. 4 shows discrete portions of the lower portion 20 having the microwave-absorbing material 30 and the induction material 42 positioned in an alternating side-by-side configuration or a horizontally adjacent configuration, wherein both the microwave-absorbing material 30 and the induction material 42 are disposed directly below the cooking surface 12 within the lower portion 20, such that the microwave-absorbing material 30 and the induction material 42 are both in thermal communication with the cooking surface 12 of the crisp plate 10 in an evenly dispersed pattern 41.

Figure 6:
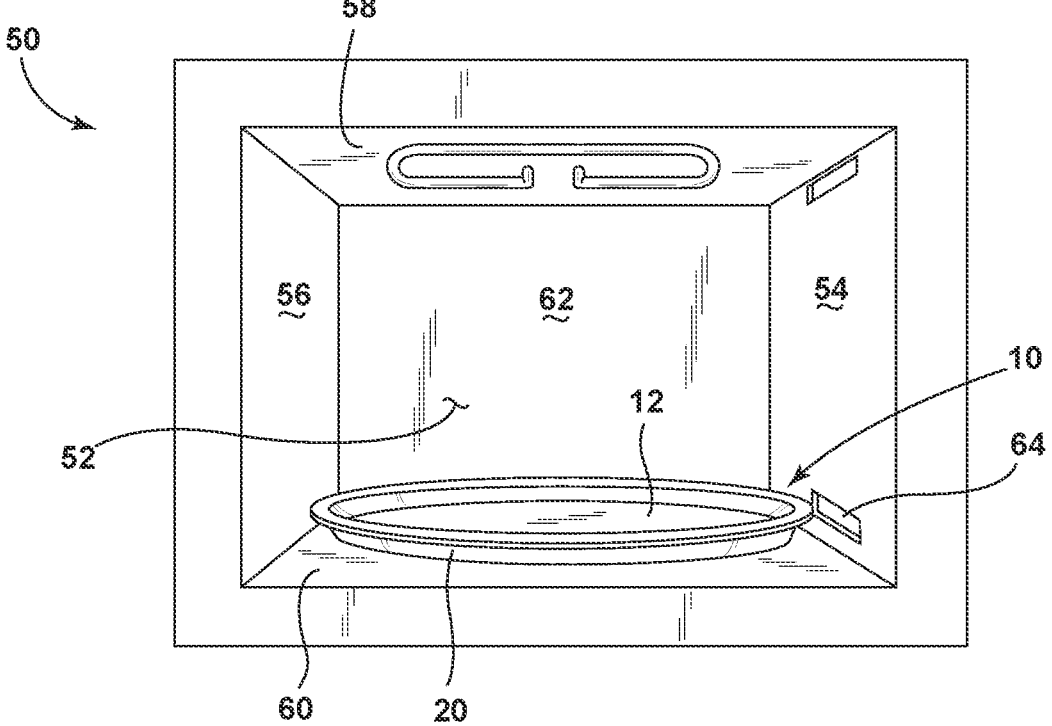
FIG. 6 is a front perspective view of a microwave oven having the crisp plate of FIG. 1 disposed in a lower portion thereof.
Figure 7:
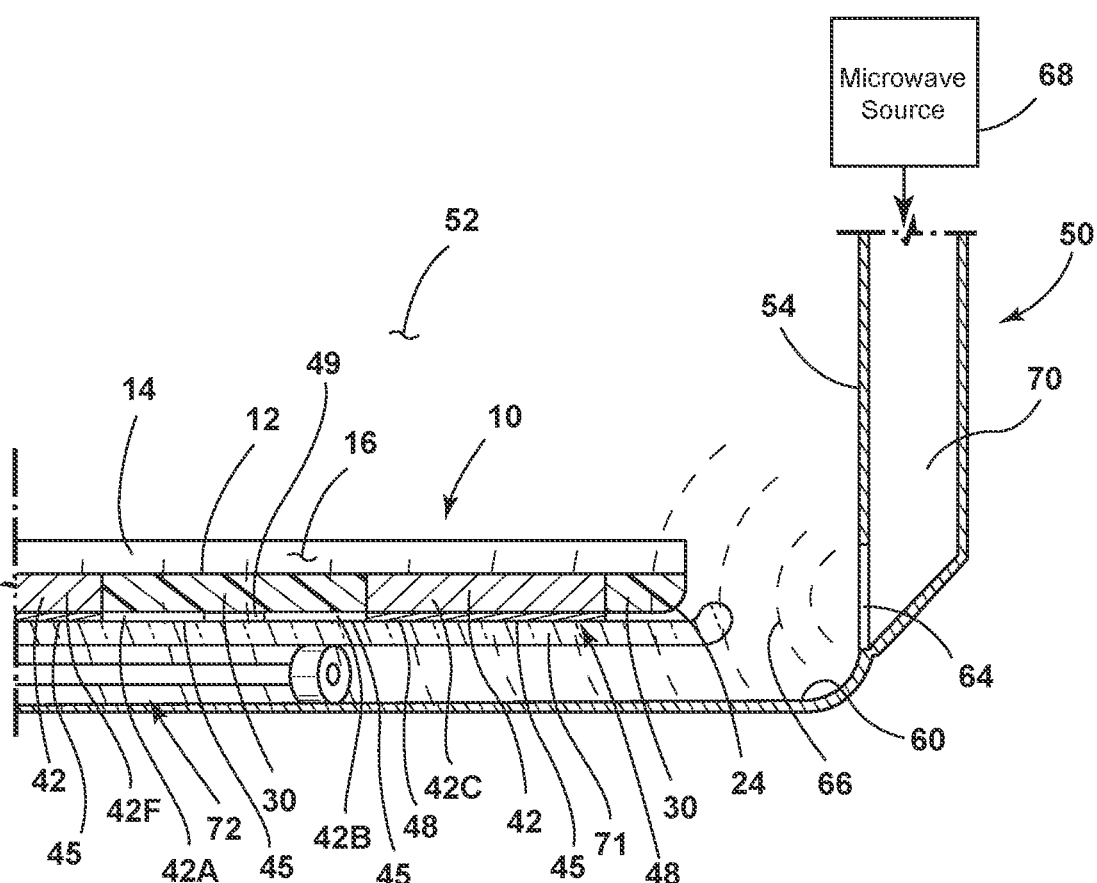
FIG. 7 is a fragmentary cross-sectional view of a microwave oven having the crisp plate of FIG. 1 supported on a roller mechanism.

Referring now to FIG. 6, a microwave oven 50 is shown, in which a door for closing a cooking cavity 52 of the microwave oven 50 has been omitted. The cooking cavity 52 is defined by sidewalls 54 and 56, a top wall 58, a bottom wall 60, and a rear wall 62. The crisp plate 10 is shown positioned on the bottom wall 60 of the microwave oven 50. Disposed along the right sidewall 56, an opening 64 is configured to supply microwaves into the cooking cavity 52. With the crisp plate 10 directly supported on the bottom wall 60 of the microwave oven 50, the standoff feature provided by the air gaps 49 (FIGS. 2 and 3) of the crisp plate 10 will allow for the microwaves of the microwave oven 50 to reach the microwave-absorbing material 30. Specifically, with reference to FIG. 7, microwaves 66 are directed into the cooking cavity 52 of the microwave oven 50 by a waveguide device 70 as generated from a microwave source 68. As shown in FIG. 7, the opening 64 and the waveguide device 70 are arranged to supply microwaves 66 to the cooking cavity 52 for cooking a food item, and are specifically configured to direct microwaves 66 to the crisp plate 10. In this way, the microwave-absorbing material 30 can absorb the electromagnetic radiation provided by the microwaves 66 to then heat the microwave-absorbing material 30, which then heats the cooking surface 12 of the crisp plate 10. It is contemplated that the crisp plate 10 may be supported on the bottom wall 60 of the microwave oven 50 by a glass plate 71 that is further supported by a rotation mechanism 72. The rotation mechanism 72 is configured to rotate the glass plate 71 and the crisp plate 10 within the cooking cavity 52 of the microwave oven 50 during a microwave cooking sequence.

Figures 8, 9:
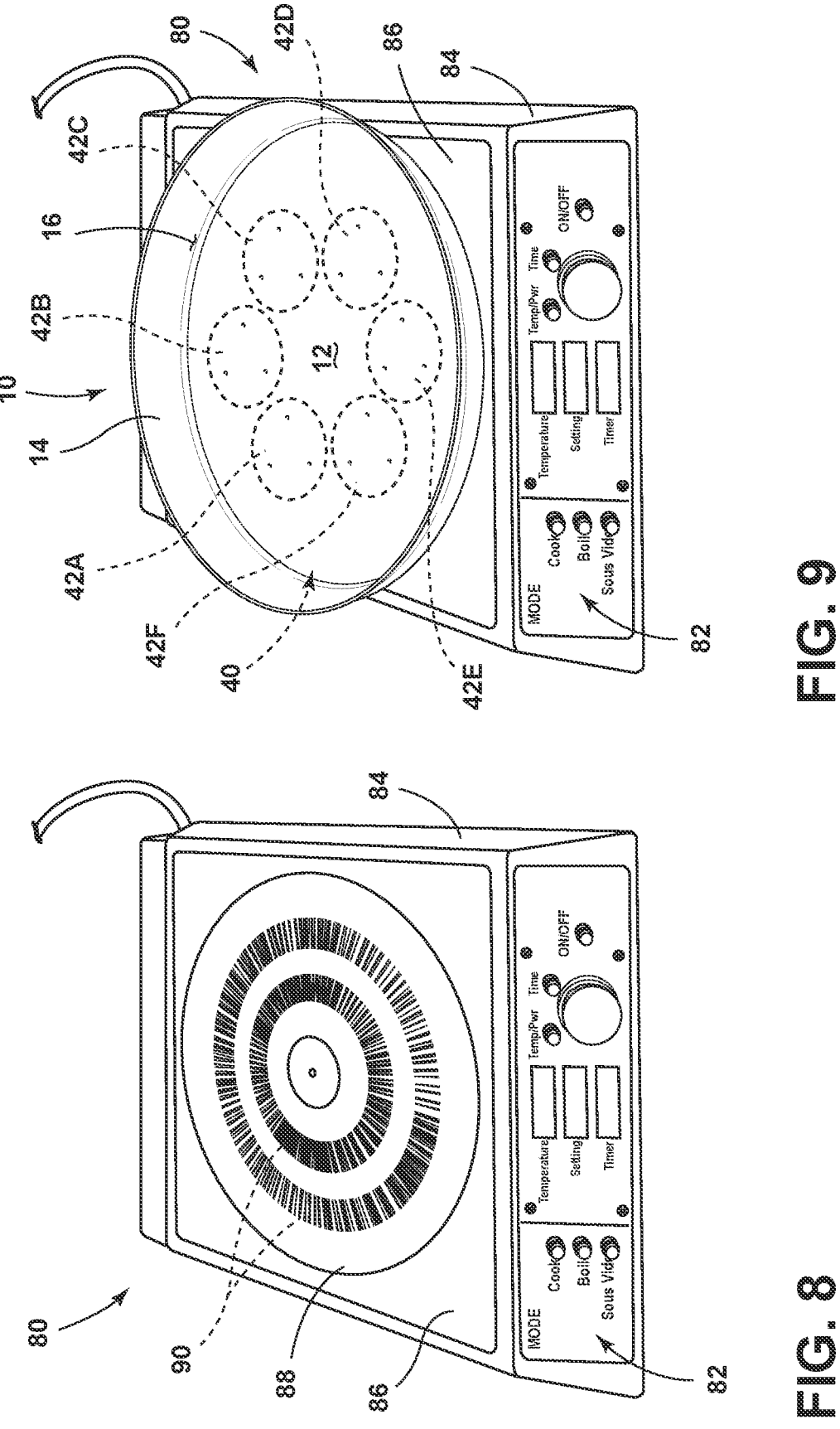
FIG. 8 is a top perspective view of an induction hob.
FIG. 9 is a top perspective view of the induction hob of FIG. 8 with the crisp plate of FIG. 1 supported on a cooktop surface thereof.

Referring now to FIGS. 8 and 9, an induction cooktop 80 is shown. As noted above, the crisp plate 10 is configured to be used with an induction cooktop 80, wherein the induction cooktop 80 creates a magnetic field that is configured to induce an electrical current within the induction material 42 of the crisp plate 10. The induction cooktop 80 may be referred to herein as an induction hob or an induction cooking appliance. The induction cooktop 80 is shown having a user interface 82 disposed on a front portion thereof. The user interface 82 is used to control heating elements disposed within a housing 84 for heating a cooktop surface 86. The cooktop surface 86 is an upper planar surface having a generally centrally-disposed heating zone 88 with a plurality of inductive coils 90 disposed thereunder. The inductive coils 90 are configured to inductively heat the induction material 42 of the crisp plate 10 via an electromagnetic field generated by the inductive coils 90. With specific reference to FIG. 9, the crisp plate 10 of the present concept is shown abuttingly supported on the cooktop surface 86 in an upright position over the heating zone 88 (FIG. 8) of the induction cooktop 80. The columns 42A-42F of the plurality of columns 40 of induction material 42 are shown positioned below the cooking surface 12 of the crisp plate 10, such that the induction material 42 of the crisp plate 10 is in proximity to the electromagnetic field generated by the induction cooktop 80 to heat the induction material 42, which then heats the cooking surface 12 of the crisp plate 10 to which the induction material 42 is in thermal proximity thereof.

As noted above, the microwave-absorbing material 30 and the induction material 42 are adjacent to the cooking surface 12 of the crisp plate 10, as disposed within discrete portions of the lower portion 20 of the crisp plate 10. In this way, the microwave-absorbing material 30 and the induction material 42 are separate and distinct from one another and are not intermixed with one another nor layered vertically above or below one another.

In at least one aspect, a cooking vessel includes a cooking surface with a lower portion positioned below the cooking surface. A microwave-absorbing material is disposed within the lower portion. An induction material is disposed within the lower portion. The induction material is disposed in discrete portions of the lower portion.

According to another aspect of the present disclosure, a cooking vessel includes a cooking surface and a lower portion positioned below the cooking surface. The lower portion includes discrete portions made of a magnetic field-absorbing material and discrete portions made of a ferromagnetic material, wherein the discrete portions made of a magnetic field-absorbing material are positioned side-by-side with the discrete portions made of a ferromagnetic material.

According to another aspect of the present disclosure, the microwave-absorbing material is configured within the lower portion to define an outer surface positioned within a first plane, and the discrete portions of the induction material each include an outer surface positioned within a second plane that is outwardly spaced-apart from the first plane.

According to another aspect of the present disclosure, the cooking surface is comprised of a metal material.

According to another aspect of the present disclosure, the microwave-absorbing material includes a ferrite component.

According to another aspect of the present disclosure, the microwave-absorbing material includes a silicon dioxide component.

According to another aspect of the present disclosure, the microwave-absorbing material includes about 75% of the ferrite component and about 25% of the silicon dioxide component.

According to another aspect of the present disclosure, the cooking surface is comprised of a non-ferrous metal material.

According to another aspect of the present disclosure, the cooking surface is comprised of aluminum.

According to another aspect of the present disclosure, the induction material is a ferromagnetic material.

According to another aspect of the present disclosure, the induction material is configured to be inductively heated upon exposure to an electromagnetic field.

According to another aspect of the present disclosure, the microwave-absorbing material includes a rubber-embedded ferrite material configured to increase in temperature upon absorption of electromagnetic radiation.

In at least another aspect, a cooking vessel is configured for use with a microwave oven or with an induction cooktop. The cooking vessel includes a plate having a cooking surface. An induction material is formed of an electrically conductive material, such that an electrical current is induced in the induction material by an electromagnetic field when the plate is placed on an induction cooktop. The induction material is thermally coupled to the cooking surface of the plate. The induction material heats the cooking surface when the electrical current is induced in the induction material. A microwave-absorbing material includes a rubber-embedded ferrite material configured to increase in temperature upon absorption of electromagnetic radiation. The microwave-absorbing material is thermally coupled to the cooking surface of the plate. The microwave-absorbing material heats the cooking surface when exposed to electromagnetic radiation.

According to another aspect of the present disclosure, the induction material is a ferromagnetic material.

According to another aspect of the present disclosure, the microwave-absorbing material includes about 75% of a ferrite component and about 25% of a silicon dioxide component.

According to another aspect of the present disclosure, the induction material and the microwave-absorbing material are positioned in a horizontally adjacent configuration below the cooking surface.

In at least another aspect, a cooking vessel includes a cooking surface and a lower portion positioned below the cooking surface. A first material is disposed within the lower portion and is in thermal proximity to the cooking surface. The first material increases in temperature upon absorption of electromagnetic radiation. A second material is disposed within the lower portion and is in thermal proximity to the cooking surface. An electrical current is induced in the second material upon exposure to an electromagnetic field.

According to another aspect of the present disclosure, the lower portion includes a first zone surrounding a second zone. The first material is positioned within the first zone, and the second material is positioned within the second zone.

According to another aspect of the present disclosure, the second material is positioned in a plurality of columns within the lower portion, and the first material surrounds each column of the plurality of columns within the lower portion.

According to another aspect of the present disclosure, the first material is configured within the lower portion to define an outer surface of the first material, and each column of the plurality of columns includes an outer surface defining a support surface of the cooking vessel, and the support surface of the cooking vessel extends outwardly from the outer surface of the first material.

According to another aspect of the present disclosure, the first material is positioned in a centrally-disposed circle within the lower portion, and the second material surrounds an outer perimeter of the circle in a ring formation.

According to another aspect of the present disclosure, the first and second materials are disposed in an alternating ring pattern within the lower portion.

According to another aspect of the present disclosure, the first and second materials are disposed in a horizontally adjacent configuration within the lower portion.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A cooking vessel, comprising:
   a cooking surface; and
   a lower portion positioned below the cooking surface, wherein the lower portion includes discrete portions made of a magnetic field-absorbing material, which includes a ferrite component, and discrete portions made of a ferromagnetic material, wherein the discrete portions made of the magnetic field-absorbing material are positioned side-by-side with the discrete portions made of the ferromagnetic material, and wherein the magnetic field-absorbing material and the ferromagnetic material are different materials.

2. The cooking vessel of claim 1, wherein the discrete portions of the magnetic field-absorbing material each include an outer surface positioned within a first plane, and further wherein the discrete portions of the ferromagnetic material each include an outer surface positioned within a second plane that is outwardly spaced-apart from the first plane.

3. The cooking vessel of claim 1, wherein the magnetic field-absorbing material includes a silicon dioxide component.

4. The cooking vessel of claim 3, wherein the magnetic field-absorbing material includes about 75% of the ferrite component and about 25% of the silicon dioxide component.

5. The cooking vessel of claim 1, wherein the cooking surface is comprised of a non-ferrous metal material.

6. The cooking vessel of claim 5, wherein the cooking surface is comprised of aluminum.

7. The cooking vessel of claim 1, wherein the discrete portions of ferromagnetic material are spaced apart from each other and surrounded by the magnetic field-absorbing material.

8. The cooking vessel of claim 1, wherein the ferromagnetic material is configured to be inductively heated upon exposure to an electromagnetic field.

9. The cooking vessel of claim 8, wherein the magnetic field-absorbing material includes a rubber-embedded ferrite material configured to increase in temperature upon absorption of electromagnetic radiation.

10. A cooking vessel, comprising:
    a cooking surface;
    a lower portion positioned below the cooking surface;
    a first material disposed within a first discrete zone of the lower portion and in thermal proximity to the cooking surface, wherein the first material increases in temperature upon absorption of electromagnetic radiation based on dielectric loss, and wherein the first material includes a rubber-embedded ferrite component; and
    a second material disposed within a second discrete zone of the lower portion and in thermal proximity to the cooking surface, wherein an electrical current is induced in the second material upon exposure to an electromagnetic field, wherein the first discrete zone is surrounded by the second discrete zone, and wherein the first material and the second material are different materials.

11. The cooking vessel of claim 10, wherein the second discrete zone includes a plurality of columns within the lower portion and spaced around a center of the lower portion, wherein the second material is positioned in each of the plurality of columns, and further wherein the first material surrounds each column of the plurality of columns within the lower portion.

12. The cooking vessel of claim 11, wherein the first material is configured within the lower portion to define an outer surface of the first material, and further wherein each column of the plurality of columns includes an outer surface defining a support surface of the cooking vessel, and further wherein the support surface of the cooking vessel extends outwardly from the outer surface of the first material.

13. The cooking vessel of claim 10, wherein the first and second materials are disposed in a horizontally adjacent configuration within the lower portion.

14. The cooking vessel of claim 1, further comprising:
    an upper side consisting of a highly thermally conductive third material.

15. The cooking vessel of claim 10, wherein the second discrete zone forms a continuous ring around at least a portion of the first discrete zone.

16. The cooking vessel of claim 15, wherein a portion of the first discrete zone forms a continuous ring around the second discrete zone.

* * * * *